June 19, 1962  T. M. HUNTER  3,040,162
ROTARY WELDING APPARATUS INCLUDING TRANSFORMER
Filed June 6, 1960  3 Sheets-Sheet 1
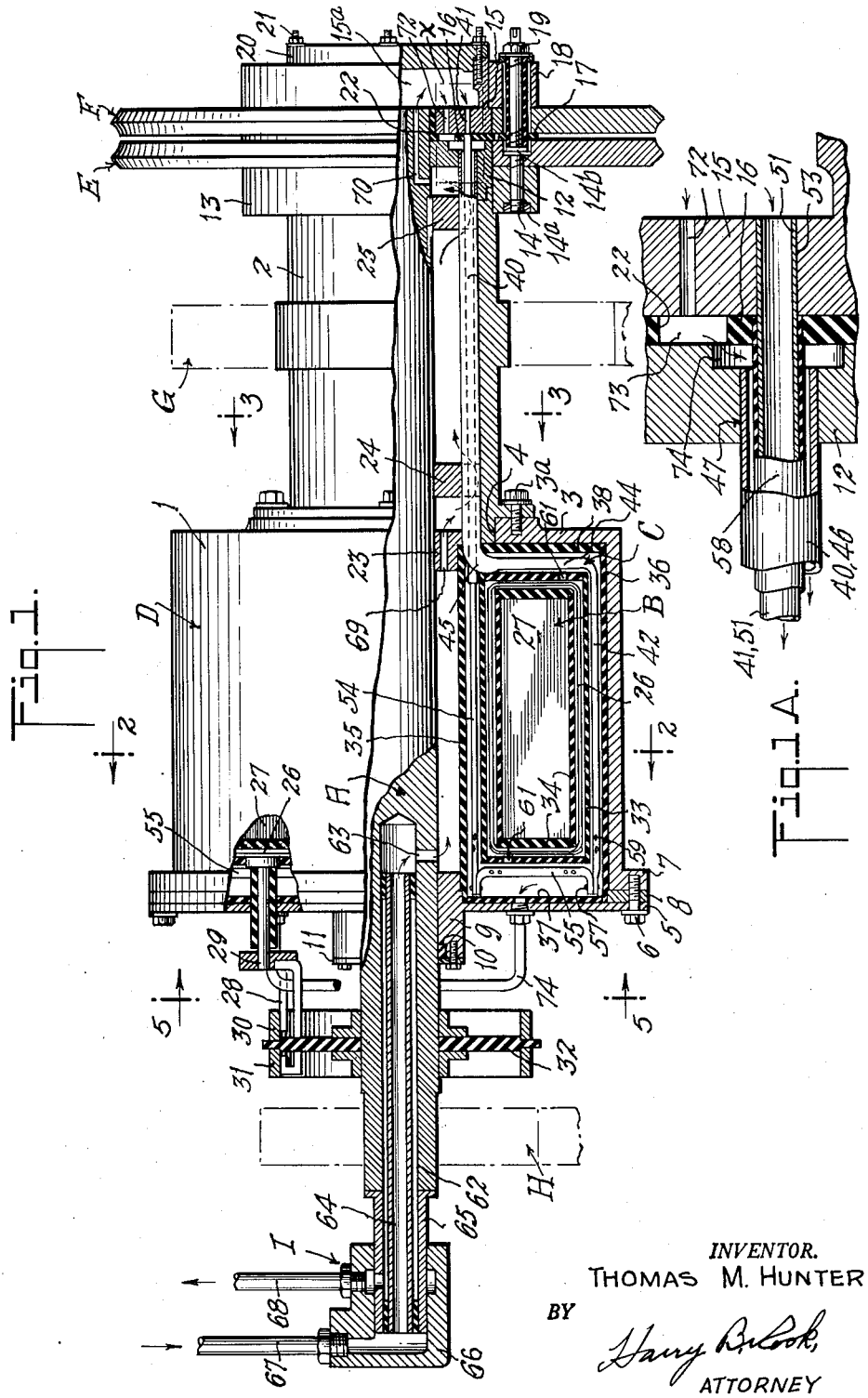
INVENTOR.
THOMAS M. HUNTER
BY
Harry B. Cook,
ATTORNEY

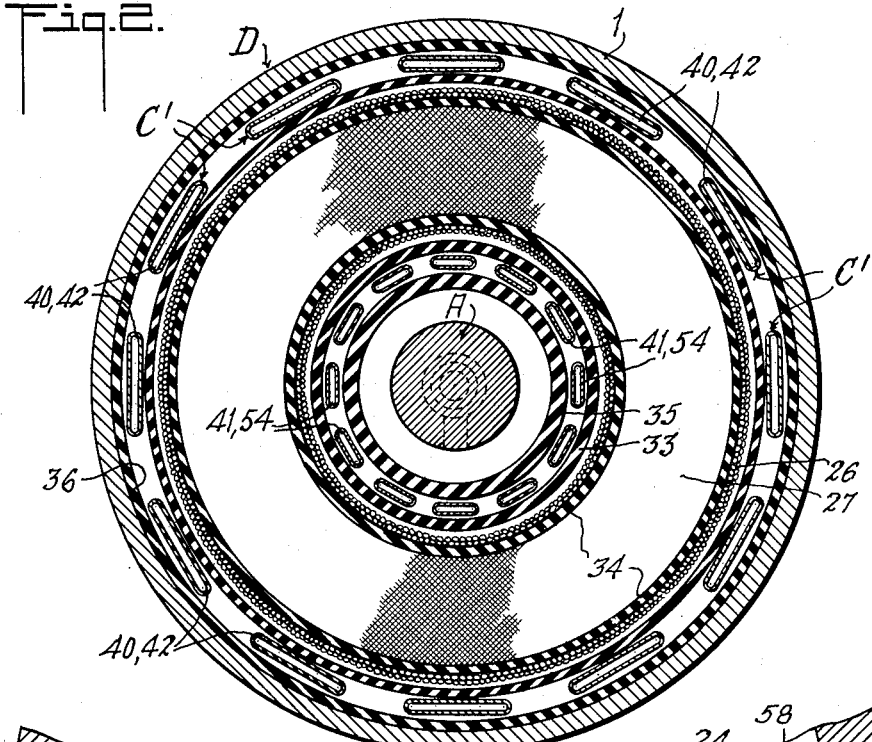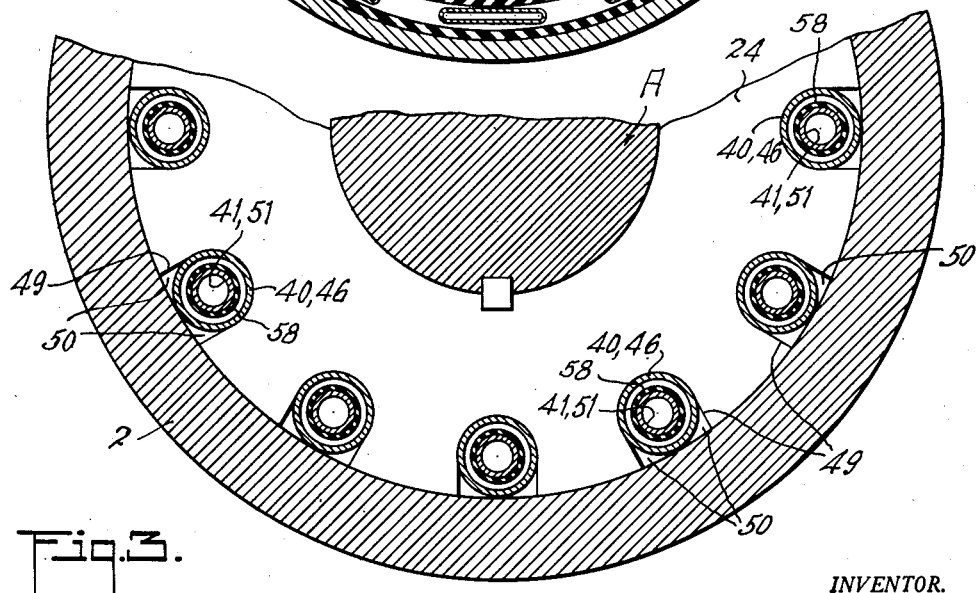

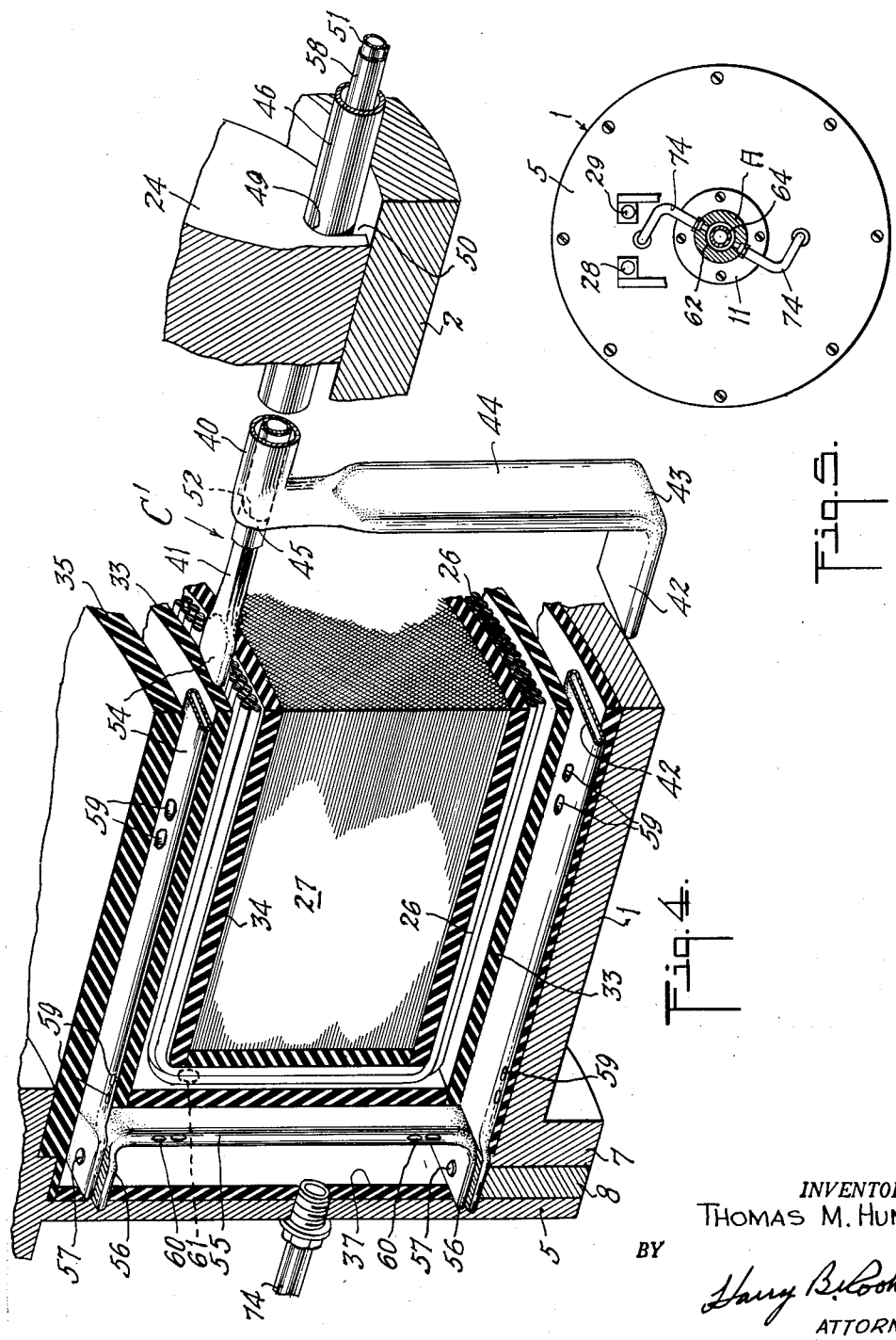

United States Patent Office 3,040,162
Patented June 19, 1962

3,040,162
ROTARY WELDING APPARATUS INCLUDING TRANSFORMER
Thomas M. Hunter, 25 Barberry Lane, Short Hills, N.J.
Filed June 6, 1960, Ser. No. 34,240
14 Claims. (Cl. 219—63)

This invention relates to a rotary electrical resistance welding apparatus of the general type shown in my Patent No. 2,561,739, dated July 24, 1951, and Patent No. 2,616,016, issued October 28, 1952, to William E. Shenk, assignor, which include transformer structures and are especially adapted for use in welding seams in sheet metal or tubing, wherein a large current with a low voltage is required.

Forty years ago, tubes were being welded by the longitudinal-seam butt-welding method at speeds of 25 to 60 feet per minute and at the present time such welding is carried on at speeds of 60 to 500 feet per minute. There is an increasing desire to perform such welding operations at higher speeds, for example, speeds of 1000 feet per minute, but welding at such speeds requires the use of higher frequencies than have been used heretofore in resistance welding apparatus. According to present practice, large currents of from 10,000 amperes to 300,000 amperes are utilized and it is recognized that the utilization of such large currents at high frequencies, for example, a frequency of 360 cycles or higher, without excesive losses, poses a serious problem in the construction of transformers which includes the provision of effective secondary conductors and efficient means for cooling the transformer.

Therefore, a primary object of the present invention is to provide a rotary welder having a transformer which shall embody novel and improved construction and arrangement of secondary conductors associated with each other and with the primary and a casing wherein the conductors shall comprise thin-walled copper tubing providing exceptionally high conductivity, for example, about 99 percent, the conductors shall be capable of handling large currents at unusually high frequencies and there shall be free circulation of a coolant and large areas of contact between the surfaces of the conductors and the coolant, so that the electrical losses shall be reduced to the minimum, a relatively small amount of metal as compared with metal used according to present practice shall be required, and the overall efficiency of the transformer shall be increased as compared with known transformers, thereby permitting the use of a smaller transformer for a given job and insuring savings in the cost of generating and sub-station equipment.

In transformers like those shown in the above patents, the casings serve as the secondaries of the transformers and generally are formed of heavy copper castings which not only provide poor conductivity but also are subject to leakage of the coolant such as oil through the pores of the casting. Therefore, another object of my invention is to provide a welding transformer of the general character described wherein the secondary shall comprise a plurality of thin-walled copper tubes and the casing shall be formed of relatively inexpensive and non-porous steel metal plate insulated from the secondary tubing.

A further object is to provide such a welding transformer which shall comprise a novel and improved secondary circuit including a plurality of identical units each comprising a loop formed of a plurality of thin-walled copper tubes of different diameters with portions of the tubes in telescoping insulated relation to each other and other portions partially flattened and encircling a portion of the primary circuit winding, said tubes of each unit being connected in series with each other and one end of one of the tubes being electrically and physically connected to one of the welding electrodes while the corresponding end of the other tube is physically and electrically connected to the other welding electrode, whereby the several units shall be connected to the electrodes in parallel circuit, the secondary and primary circuit shall be closely coupled, there shall be less bulk in secondary copper, the coolant shall freely circulate through the interiors of the tubes as well as exteriorly thereof and around the primary winding, and consequently the transformer shall be efficiently cooled and the eddy current loss shall be exceptionally small at all frequencies thereby resulting in a great saving in energy at all frequencies, which is especially important with frequencies above 60 cycles.

Other objects are to provide rotary welding apparatus of the character described which shall be simple and relatively inexpensive, which shall require a minimum of machining of parts and shall eliminate the heretofore necessary machining of the cast copper casings and which shall possess exceptional electrical efficiency at unusually low cost; and to obtain other advantages and results that will be brought out by the following description in conjunction with the accompanying drawings in which FIGURE 1 is a side elevation of a rotary welding apparatus embodying the invention with portions broken away and shown in longitudinal vertical sections;

FIGURE 1A is an enlarged fragmentary view partially in vertical section and partially in elevation of the portion of the apparatus enclosed by the broken lines X of FIGURE 1;

FIGURE 2 is an enlarged transverse vertical sectional view approximately on the plane of the line 2—2 of FIGURE 1;

FIGURE 3 is an enlarged transverse vertical sectional view on the plane of the line 3—3 of FIGURE 1 with portions broken away;

FIGURE 4 is a greatly enlarged fragmentary sectional perspective view of one of the secondary circuit units, a portion of the primary circuit with which said unit is associated and portions of the casing, with portions of the secondary unit broken away for clearness in illustration; and FIGURE 5 is a transverse sectional view taken approximately on the plane of the line 5—5 of FIGURE 1.

Specifically describing the illustrated embodiment of the invention, the reference character A designates an elongated rigid supporting shaft upon which is supported the primary B, the secondary generally designated C and a casing generally designated D within which the primary and secondary are enclosed. As shown, the casing includes two sections 1 and 2 which may be formed of steel plate, the section 2 being shown as tubular and coaxial with the shaft and secured by cap screws 3a to one end wall 3 of section 1 with an end portion extending into said section 1 through an opening 4 in the end wall. The section 1 is open at its other end for insertion and removal of the secondary and primary into and from the casing and is normally closed by a cover plate 5 secured by cap screws 6 to an integral circumferential flange 7 projecting from the casing section. Preferably there is a packing ring 8 clamped between the cover and the flange to precent escape of oil from the casing. The cover 5 has a coaxial cylindrical hub portion 9 through which extends the shaft A, there being a packing ring 10 to seal the joint between the hub and the shaft and normally clamped into position by a clamping ring 11.

Electrodes E and F, shown as of the wheel type, comprise, as usual, parts of the secondary circuit and may be associated with the shaft A and the casing in any suitable manner. As shown, the inner wheel E is supported upon the highly conductive ring member 12 which is in turn supported directly on the shaft A in axial engagement with a shoulder thereof. As shown, the ring member is secured to the casing section 2 by a split collar 13 that is tightened around the casing section and an axial extension of the ring by known means (not shown); and the collar is rigidly secured to the electrode wheel E by bolts 14 between nuts 14a and 14b. The electrode wheel F is shown as mounted on a second ring member 15 which is maintained in spaced relation to the ring member 13 by non-conductive separators 16 and 17 and is insulated from the shaft A as indicated at 22. A split collar 18 is secured to the ring member 15 in the same manner in which the split collar 13 is secured to the ring member 12, and the electrode wheel F is secured to said split collar 18 by nuts 19 on the ends of the bolts 14 opposite the nuts 14a that are insulated from the wheel and the ring member as shown. An end closure plate 20 is secured on the ring 15 by bolts 21 providing a chamber 15a.

The whole assembly is mounted in any suitable manner to permit rotation of the electrode wheels; for example, the casing section 2 and the shaft A may be mounted in suitable supports G and H that may include radial bearings and stationary supports therefor, generally designated by broken lines in FIGURE 1. Preferably spacer rings 23, 24 and 25 are disposed between the shaft A and the end portions of the casing opposite the hub 9 so that the casing will be firmly supported on the shaft.

As hereinbefore stated, the casing in the prior apparatus has comprised a part of the secondary circuit and has been formed of castings which had to be specially cast and machined to suit special designs, and it has been difficult and expensive to make such castings sufficiently thick and non-porous to afford reasonably good conductivity, for example 80 percent, and avoid leakage of the coolant. Important features of the present invention are that the casing does not comprise any part of the secondary circuit and is formed of relatively thin non-porous steel plate, while the secondary is composed of thin-walled standard hard drawn copper tubing having high conductivity of for example 99 percent, and of such shape and size as to afford efficient contact with the coolant, so as to reduce losses in the first place and to more effectively dissipate heat in the second place.

The section 1 of the casing encloses the primary winding 26 which may or more not be wound upon an annular iron core 27 depending upon the purpose for which the transformer is to be used, and the winding is connected to a source of current by conductors 28 and 29 which extend from the cover plate 5 in insulated and fluid-tight relation thereto and are connected to slip rings 30 and 31, respectively. As shown, the slip rings are supported in a well known manner on the shaft A by a disc 32 of electrical insulating material; and, as is known in the art, suitable brushes (not shown) are mounted in yieldable frictional contact with the respective slip rings to conduct current from a source to the slip rings and conductors 28 and 29. The primary winding is insulated from the casing by a sheath 33 of insulation and also is insulated from the iron core by a layer of insulation 34. A tube of insulating material 35 coaxially encircles the portion of the shaft A within the main casing section 1 and is mounted on an inward extension of the hub 9 and the spacer ring 23 so as to provide a space between said tube and the shaft for circulation of a coolant as hereinafter described. Also, a layer 36 of insulating material covers the inner surface of the cylindrical wall of the main casing section 1 and flat rings 37 and 38 of insulating material are secured to the inner surfaces of the cover plate 5 and the end wall 3 of the casing section.

The secondary C comprises a plurality of units C' each of which is a loop formed of a plurality of hard drawn copper tubes, that are equidistantly circumferentially spaced with respect to the primary winding. There are shown two tubes 40 and 41 of substantially different diameters. The tube 40 has one end portion expanded and partially flattened as indicated at 42, said portion being of a length greater than the width of the primary winding and being loosely disposed between the insulating sheath 33 and insulating layer 36 across the outer cylindrical face of the primary winding. The flattened end portion is bent at approximately right angles as indicated at 43 to provide another portion 44 that is disposed in spaced and approximately parallel relation to one end of the primary winding and is loosely disposed between the sheath of insulation 33 and the insulating plate 38 in radial relation to the shaft A. At the end of the portion 44 opposite the bend 43, the tube 40 has a bend 45 that provides an elongated straight cylindrical portion 46 which extends longitudinally of the casing section 2 and has one end tightly fitted in an opening 47 extending through the ring member 12 of the inner wheel electrode E as best shown in FIGURE 1A. The portions 46 of the several secondary units are firmly held in equidistantly circumferentially spaced relation by the spacer rings 23, 24 and 25 which have peripheral notches 49 through each of which one of the tube portions 46 extends with clearance between said tube portions and the casing section as indicated at 50 for circulation of a coolant as hereinafter described.

The tube 41 has a straight cylindrical portion 51 extending through the portion 46 of the tube 40 and through an opening 52 at the bend 45 of the tube 40, and one end of said portion 51 of the tube 41 extends through and is tightly secured in an opening 53 in the ring member 15 of the outer wheel electrode F. The opposite end portion of the tube 41 is partially flattened as indicated at 54 and extends lengthwise of the inner periphery of the primary winding and between the insulating sheath 33 and the insulating tube 35. The extremities of the flattened end portions 42 and 54 of the tubes 40 and 41 extend beyond the primary winding and are rigidly connected by a flattened copper tube 55 whose ends are bent at right angles to the main portion as indicated at 56 and are riveted or otherwise rigidly secured as indicated at 57 directly to the ends of the corresponding tubes 40 and 41. As shown in FIGURES 1 and 4, the tubes 55 are disposed between the insulating sheath 33 of the primary winding and the insulating ring 37 on the cover plate 5. The portion 51 of the tube 41 is insulated from the portion 46 of the tube 40 by an insulating sleeve 58 that preferably snugly encircles the tube portion 51 and is in spaced relation to the inner surface of the tube portion 46 to permit circulation of a coolant as hereinafter described. It will be observed that the tubes 40 and 41 have free passages therethrough from the ends that are secured to the ring members 12 and 15 to the ends that are connected by the tube 55, and the walls of the flattened portions 54 and 42 adjacent the ends thereof that are connected by the tube 55 have apertures 59 so that a coolant such as oil may flow through the tubes and said apertures. Similarly, the tube 55 has apertures 60 to permit flow of the coolant therethrough. It will also be noted that the tubes are spaced from adjacent portions of the casing and the primary winding to further provide for flow of the coolant and to insure circulation of the coolant in direct contact with the primary winding, the end wall of the insulating sheath 33 having apertures therethrough.

The coolant circulating system includes a coaxial bore 62 in the shaft A which extends from the end of the shaft opposite the wheel electrodes inwardly to the main casing section 1 and at the inner end of the bore is a transverse duct 63 leading from the bore to the chamber in the casing between the insulating tube 35 and the shaft A. Mounted coaxially in said bore the rotating member 65 of a rotary fluid coupling generally designated I and in spaced relation to the walls thereof is a tube 64 which provides a passage through the tube and another passage between the tube and the walls of the bore. The rotating member 65 is secured to the end of the shaft A and is rotatable in a stationary member 66 having an inlet and outlet 67 and 68, respectively, which are connected to for example a pump for a non-conductive fluid coolant, for example oil. The inlet 67 communicates with the passage through the tube 62 while the outlet 68 communicates with the passage between the tube 64 and the wall of the bore 62.

It will be obvious to those skilled in the art that the two wheel electrodes E and F are the respective terminals of the secondary circuit one of which is connected to the tube 40 while the other is connected to the tube 41; and the two said tubes are connected by the tube 55 so that each tube 40 and 41 serves as one leg of the circuit.

With this construction and arrangement of parts, it can be seen that the coolant may flow into the transformer through the inlet 67 from a suitable circulating means through the tube 64 and duct 63 into the chamber between the insulating tube 35 and the shaft A. Thence the coolant may flow through apertures 69 in the spacer ring 23 into the casing section 2, through the clearance passages 50 in the spacer rings 24 and 25 and into contact with the portions 46 of the secondary tubes 40. The coolant then flows from the secondary casing section through a passage 70 in the shaft A into the chamber 15a formed between the end cap 20 and the main portion of the ring member 15. The coolant flows from the chamber 15a into the portion 51 of the secondary tube 41 and through a duct 72 in the ring member into a space 73 between the ring members 12 and 15, thence into a counter bore 74 in the ring member 12 and then into the end of the secondary tube portion 46 and through the space between the two secondary tube portions 51 and 46. The oil flows through the tubes 40 and 41 and out of the apertures 59 into the spaces in which the tubes are positioned and thence through the apertures 61 in the insulating sheath 33 into the space around the primary winding. Some of the coolant also flows into and out of the tubes 55 through the apertures 60. From the space in the casing section 1 in which the secondary and primary are arranged, the coolant flows outwardly through conduits 74 into the space between the tube 64 and the wall of the bore 62 in the shaft A and thence outwardly through the outlet 68 back to the pump or other circulating means.

The thin-walled copper tubes with their flattened portions as best shown in FIGURES 2 and 4 provide exceptionally high electrical conductivity and large surface areas for contact with the coolant to insure efficient cooling, and the thin-walled tubes also make it possible to operate the welding apparatus with high frequencies of for example 360 cycles or higher and heavy currents of the order of 100,000 to 300,000 amperes, with a minimum of electrical and eddy current losses. This structure can be used with much higher frequencies of the order of 300 to 400 kilocycles with modifications in the core structure and size and arrangement of the tubing. In some cases, the iron core could be eliminated, especially when the transformer is to be used for extremely high frequencies.

I claim:

1. In a resistance welding apparatus having a support, a welding transformer mounted on said support comprising a primary winding and a secondary circuit that includes a pair of welding electrodes mounted on said support in opposed parallel insulated relation to each other, said secondary circuit also comprising a plurality of units each formed of copper tubing having portions in inductive relation to said primary winding and having one terminal connected to one electrode and the other terminal connected to the other electrodes.

2. In a rotary resistance welding apparatus having a supporting shaft, a welding transformer mounted on said shaft comprising a primary winding and a secondary circuit that includes a pair of wheel electrodes mounted on the shaft in opposed parallel insulated relation to each other said secondary circuit also comprising a plurality of units spaced apart circumferentially of said shaft and each formed of copper tubing having portions in inductive relation to said primary winding and its ends connected respectively to said wheel electrodes.

3. In a resistance welding apparatus having a support, a welding transformer mounted on said support comprising a primary winding and a secondary circuit that includes a pair of welding electrodes mounted on said support in opposed parallel insulated relation to each other, said secondary circuit also comprising a plurality of separate units each formed of copper tubing having portions in inductive relation to said primary winding and spaced from said portions of adjacent units and having its ends connected respectively to said electrodes.

4. In a resistance welding apparatus as defined in claim 3, the addition of a casing enclosing said transformer and providing space for circulation of a cooling fluid around said secondary tubing and said primary winding, and there being also passages for circulation of said cooling fluid into and through said tubing into said space and outwardly from said space.

5. In a rotary resistance welding apparatus as defined in claim 2, the addition of a casing enclosing said transformer and providing space for circulation of a cooling fluid around said secondary tubing and said primary winding, and there being also passages for circulation of said cooling fluid into and through said tubing into said space and outwardly from said space.

6. In a rotary resistance welding apparatus as defined in claim 2, the addition of a casing enclosing said transformer and having said electrodes mounted on one end thereof in axially spaced relation to the transformer, said casing providing a space for circulation of a cooling fluid around said secondary tubing and said primary winding and also providing a chamber and passages for flow of cooling fluid from an inlet into both ends of said tubing through the tubing into said space and outwardly from said space.

7. In a rotary resistance welding apparatus as defined in claim 2, each of said secondary tubing units including two tubes of different diameter connected together at one end, each having a partially flattened end portion in inductive relation to the primary winding and each having its opposite end portion elongated and straight, the straight portion of the smaller diameter extending through the portion of larger diameter in insulated spaced relation thereto.

8. In a rotary resistance welding apparatus as defined in claim 2, each of said secondary tubing units including two tubes of different diameter connected together at one end, each having a partially flattened end portion in inductive relation to the primary winding and each having its opposite end portion elongated and straight, the straight portion of the smaller diameter extending through the portion of larger diameter in insulated spaced relation thereto, and the addition of a casing enclosing said transformer and providing a space around said secondary tubing and said primary winding for circulation of a cooling fluid and there being passages providing for flow of cooling fluid into said straight end portions through said tubes into said space and outwardly from said space.

9. In a rotary resistance welding apparatus as defined in claim 2, said primary winding being annular and coaxial with said shaft, and said plurality of secondary circuit units being spaced apart circumferentially of said primary winding.

10. A transformer including an annular primary winding, a plurality of secondary circuit units, each including two cylindrical copper tubes having corresponding end portions partially flattened in parallel spaced relation and electrically connected together, and having their other end portions of different diameters and arranged in spaced telescopic insulated relation to each other, said units being equidistantly spaced apart circumferentially of said primary winding with said flattened portions in inductive relation to the inner and outer peripheries of said primary winding, respectively, the second-mentioned ends of said tubes constituting the terminals for connection to other electrical parts.

11. A transformer as defined in claim 10 with the addition of a casing enclosing the transformer and providing space for circulation of a cooling fluid around and in heat-transferring relation to said primary winding and said secondary circuit units, and there being passages for cooling fluid from a source into the second-mentioned ends of said tubes, through the tubes into said space and outwardly from said space.

12. A resistance welding apparatus comprising a supporting shaft, a welding transformer including an annular primary winding mounted concentrically about said supporting shaft and a secondary circuit that includes a pair of welding electrodes mounted on said shaft in insulated relation to each other and in spaced relation to said primary winding, said secondary circuit also comprising a plurality of separate and distinct units comprising loops spaced apart circumferentially of said shaft and said primary winding and each having portions in inductive relation to said primary winding and spaced circumferentially of said winding from said portions of adjacent units, each unit having its ends disposed toward said electrodes, one end connected to one electrode and its other end connected to the other electrode.

13. A resistance welding apparatus as defined in claim 12 wherein each of said units includes two copper tubes of different diameter connected together at one end, each having a partially flattened end portion in inductive relation to the primary winding and each having its opposite end portion elongated and straight, the straight portion of the smaller diameter extending through the portion of larger diameter in insulated spaced relation thereto.

14. A resistance welding apparatus as defined in claim 13 with the addition of a casing enclosing said primary winding and secondary units and providing a space around said secondary tubing and said primary winding for circulation of a cooling fluid and there being passages providing for flow of cooling fluid into said straight end portions through said tubes into said space and outwardly from said space including openings in said tubes between the ends of the tubes.

References Cited in the file of this patent
UNITED STATES PATENTS

| | | |
|---|---|---|
| 1,979,882 | Hunter | Nov. 6, 1934 |
| 2,132,196 | Von Henke | Oct. 4, 1938 |
| 2,515,264 | Rosmusen | July 18, 1950 |
| 2,561,739 | Hunter | July 24, 1951 |
| 2,605,376 | Schuttler | July 29, 1952 |
| 2,616,016 | Shenk | Oct. 28, 1952 |
| 2,964,610 | Mackey | Dec. 13, 1960 |